United States Patent Office 3,786,072
Patented Jan. 15, 1974

3,786,072
PREPARATION OF ALKYL SUBSTITUTED UNSATURATED POLYBASIC ACID ANHYDRIDES
Louis Schmerling, Riverside, Ill., assignor to Universal Oil Products Company, Des Plaines, Ill.
No Drawing. Filed Mar. 15, 1971, Ser. No. 124,579
Int. Cl. C07c 57/19, 61/102
U.S. Cl. 260—345.9                    9 Claims

ABSTRACT OF THE DISCLOSURE

Alkyl-substituted unsaturated polybasic acid anhydrides are prepared by condensing saturated hydrocarbons with poly-halo-substituted unsaturated polybasic acid anhydrides in the presence of free radical-generating compounds at elevated temperatures to produce the desired product.

This invention relates to a process for preparing alkyl-substituted polybasic acid anhydrides and particularly to a process for preparing both mono- and dialkyl-substituted unsaturated polybasic acid anhydrides. The products which may be prepared according to the process of this invention are useful in the chemical industry and particularly as intermediates in the preparation of plastics and polymers. In addition to being used per se as intermediates, it is also contemplated that the alkyl-substituted unsaturated polybasic acid anhydrides may be subjected to further treatment, and particularly halogenation such as chlorination or bromination prior to being used as intermediates whereby the halogenated compounds will impart flame-retardant or fire-resistant characteristics to the finished plastic or polymer.

It is therefore an object of this invention to provide a process for preparing desirable chemical compositions of matter.

A further object of this invention is to provide a process for condensing certain saturated hydrocarbons with polyhalo-, and particularly polychloro-substituted unsaturated polybasic acid anhydrides to form the desired products.

In one aspect an embodiment of this invention resides in a process for the preparation of an alkyl-substituted unsaturated polybasic acid anhydride which comprises condensing a saturated hydrocarbon with a polyhalo-substituted unsaturated polybasic acid anhydride characterized by containing at least one carbon atom on each of the doubly-bonded carbon atoms in the presence of a free radical-generating compound at condensation conditions and recovering the resultant alkyl-substituted unsaturated polybasic acid anhydride.

A specific embodiment of this invention is found in a process for the preparation of an alkyl-substituted unsaturated polybasic acid anhydride which comprises condensing cyclohexane with dichloromaleic anhydride in the presence of di-t-butyl peroxide at a temperature in the range of from about 50° to about 300° C. and at least as high as the decomposition temperature of said di-t-butyl peroxide and recovering the resultant 3-chloro-2-cyclohexylmaleic anhydride or dicyclohexylmaleic anhydride.

Other objects and embodiments will be found in the following further detailed description of the present invention.

As hereinbefore set forth the present invention relates to a process for the preparation of alkyl-substituted unsaturated polybasic acid anhydrides. For purposes of this invention, the term "alkyl-substituted" as utilized in the present specification and appended claims will refer to both alkyl and cycloalkyl substituents as well as to both mono- and dialkyl-substituted products. The process is effected by condensing a saturated hydrocarbon, with an alkane or cycloalkane, which is characterized by the presence of at least one hydrogen atom attached to a secondary or tertiary carbon atom with a polyhalo substituted unsaturated polybasic acid anhydride which in turn is characterized by the presence of a chlorine atom attached to each of the doubly-bonded carbon atoms in the unsaturated portion of the compound. The condensation is brought about by the presence of a free radical-generating compound, which acts as an initiator for the reaction.

The initiators which are used in the process of this invention are those which are capable of forming a free radical under the reaction conditions hereinafter set forth in greater detail. These compounds which act to initiate the condensation reaction are free radical-generating compounds and will include diazonium compounds, metal-alkyls, and peroxy compounds. Suitable peroxy compounds contain the bivalent radical —O—O— which decomposes to form free radicals which initiate the general reaction of the present invention. Examples of such peroxy compounds are the persulfates, perborates and percarbonates of the alkali metals and ammonium; peracetic acid, persuccinic acid, dimethyl peroxide, diethyl peroxide, di-t-butyl peroxides, dipropyl peroxide, acetyl peroxide, propionyl peroxide, butyryl peroxide, lauroyl peroxide, benzoyl peroxide, Tetralin peroxide, urea peroxide, t-butyl perbenzoate, t-butyl hydroperoxide, methylcyclohexyl hydroperoxide, 2,4-dichlorobenzoyl peroxide, methyl ethyl ketone peroxide, cyclohexanone peroxide, cumene hydroperoxide, diisopropylbenzene hydroperoxide, paramenthane hydroperoxide, isopropyl percarbonate, etc. The organic peroxy compounds constitute a preferred class of initiator for use in this invention. Mixtures of peroxy compound catalysts may be employed or the peroxy compounds may be utilized in admixture with various diluents for the process of this invention. Thus organic peroxy compounds which are compounded commercially with various diluents for use as free radical-generating compounds may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl phthalate, methyl ethyl ketone peroxide in dimethyl phthalate, cyclohexanone peroxide compounded with dibutyl phthalate, acetyl peroxide in dimethyl phthalate, etc. Only catalytic amounts (less than stoichiometric amounts) need be used in the process.

In selecting the particular condensation temperature for use in the present invention, two considerations must be taken into account. First, sufficient energy by means of heating must be applied to the reaction system so that the reactants, namely, the alkyl compound of the type hereinafter set forth in greater detail and the polyhalo-substituted unsaturated polybasic acid anhydride will be activated sufficiently for condensation to occur when free radicals are generated by the catalyst. Second, free radical-generating compounds such as peroxy compounds, and particularly organic peroxides, decompose a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical-generating compound decomposes smoothly with the generation of free radical at a half life which is not too long. In other words, sufficient free radicals must be present to induce the present chain reaction to take place, and these radicals must be formed at a temperature at which the reactants are in a suitable activated state for condensation. When the half life of the free radical-generating compound is greater than 10 hours, radicals are not generated at a sufficient rate to cause the reaction of the process of the present invention to go forward at a practical rate. Thus depending on the particular peroxide, the reaction temperature may be within the range of from about 50° to about 300° C. and at least as high as the decomposition temperature of the catalyst, by which is meant a temperature such that the half life of the free radical-generating compound is not greater than 10 hours. Since the half life for each free radical-generating substance is different at different temperatures, the exact temperature to be utilized in a particular reaction will vary. However, persons skilled in the art are well acquainted with the half life vs. temperature data for different free radical-generating compounds and thus it is within the skill of one familiar with the art to select the particular temperature needed for any particular free radical-generator. Generally, the operating temperature does not exceed the temperature at which the half life is not more than 10 hours by more than about 150° C. since free radical-generating compounds decompose rapidly under such conditions. However, in some instances, temperatures as high as 300° C. may be utilized, for example, when the reactor is charged with a portion of the alkyl compound and the polychloro-substituted unsaturated polybasic acid anhydride and the free radical-generating compound in solution in another portion of the alkyl compound is introduced, usually by means of pressure as a liquid, into the reactor which is maintained at the high temperature. The half life of t-butyl perbenzoate is less than 10 hours at about 110° C. and accordingly when this peroxy compound is used the initiator for this process, the operating temperature is from about 110° to about 300° C., but generally not greater than about 260° C. An operating temperature of from about 130° to about 300° C., and preferably to about 280° C., is used with di-t-butyl peroxide, and from about 75° to about 300° C., but generally not greater than 225° C. with benzoyl peroxide. Little advantage is gained if the temperature is too high even though the reaction is to become more activated in the presence of the free radical-generating compound decomposing at a high rate since decomposition of the polychloro-substituted unsaturated polybasic acid anhydride takes place at a temperature above about 300° C. In the preferred embodiment of this invention, the diacyl peroxides such as acetyl peroxide, benzoyl peroxide, etc., are preferred over other peroxides such as di-t-butyl peroxide and t-butyl perbenzoate, inasmuch as the alcohol byproducts from the latter type of peroxides will undergo reaction with a portion of the anhydrides thereby diminishing the yield of the desired product.

The concentrations of the initiator which is employed in the process of the present invention may vary over a rather wide range, but for reasons of economics, it is desirable to use lower concentrations of initiators, such as from about 0.1% up to about 10% of the total weight of the alkyl compound and the polyhalo substituted unsaturated polybasic acid anhydride charged to the process. The reaction time may vary and be within the range of from less than 1 minute to several hours, depending upon the reaction conditions of and the half life of the free radical-generating compounds as hereinbefore set forth. Generally speaking, a contact time of at least 10 minutes is preferred.

Examples of saturated compounds which may be employed as one of the starting materials of the present process, may be alkanes or cycloalkanes and which are characterized by the presence of at least one hydrogen atom on a secondary or tertiary carbon atom will incude alkanes containing from 3 up to about 20 carbon atoms or more such as propane, butane, pentane, hexane, heptane, octane, nonane, decane, undecane, dodecane, tridecane, tetradecane, pentadecane, hexadecane, heptadecane, octadecane, nonadecane, eicosane, and branched chain isomers thereof, etc.; cycloalkanes such as cyclopentane, cyclohexane, cycloheptane, cyclooctane, methylcyclopentane, ethylcyclopentane, 1,2-dimethylcyclopentane, 1,3-dimethylcyclopentane, methylcyclohexane, ethylcyclohexane, 1,2-dimethylcyclohexane, 1,3-dimethylcyclohexane, 1,4-dimethylcyclohexane, methylcycloheptane, ethylcycloheptane, 1,2-dimethylcycloheptane, 1,3-dimethylcycloheptane, 1,4-dimethylcycloheptane, cyclooctanes, etc. It is also contemplated within the scope of this invention that alkanes and cycloalkanes which contain substituents other than hydrocarbon radicals may also be utilized, although not necessarily with equivalent results. Some specific examples of these saturated hydrocarbons containing non-hydrocarbon substituents will include 1-chloropropane, 1-bromopropane, 1,2-dichloropropane, 1,2-dichlorobromopropane, 1-chlorobutane, 1-bromobutane, 1,4-dibromobutane, 1-chloropentane, 1,5-dichloropentane, 2-nitrobutane, 2-aminobutane, 2-nitropentane, 2-aminopentane, 2-nitrohexane, 2-aminohexane, 2-alkoxybutane, 2-ethoxybutane, 2-propoxybutane, 2-alkoxypentane, 2-ethoxypentane, 2-propoxypentane, 2-alkoxyhexane, 2-ethoxyhexane, 2-propoxyhexane, 2-alkoxyheptane, 2-ethoxyheptane, 2-propoxyheptane, 2-alkoxyoctane, 2-ethoxyoctane, 2-propoxyoctane, chlorocyclopentane, bromocyclopentane, chlorocyclohexane, bromocyclohexane, methoxycyclopentane, methoxycyclohexane, nitrocyclopentane, nitrocyclohexanet, etc.

Specific examples of polyhalo-substituted unsaturated polybasic acid anhydrides characterized by the presence of a chlorine atom on each of the doubly-bonded carbon atoms will include dichloromaleic anhydride, 2,3-dichloroglutaconic anhydride, (1,2-dichlorovinyl)succinic anhydride, (1,2,2-trichlorovinyl)succinic anhydride, (2-fluoro-1,2-dichlorovinyl)succinic anhydride, (2,3-dichloroallyl) succinic anhydride, (2,3,3-trichloroallyl)succinic anhydride, (3-fluoro-2,3-dichloroallyl)succinic anhydride, 2-(1,2-dichlorovinyl)glutaconic anhydride, 2-(1,2,2-trichlorovinyl)glutaconic anhydride, 2-(2-bromo-1,2-dichlorovinyl)glutaconic anhydride, 2-(2,3-dichloroallyl)glutaconic anhydride, 2-(2,3,3-trichloroallyl)glutaconic anhydride, 2-(3-bromo-2,3-dichloroallyl)glutaconic anhydride, 3-(1,2-dichlorovinyl)glutaconic anhydride, 3-(1,2,2-trichlorovinyl)glutaconic anhydride, 3-(2,3-dichloroallyl) glutaconic anhydride, 3-(2,3,3-trichloroallyl)glutaconic anhydride. It is also contemplated within the scope of this invention that polychloro-substituted anhydrides of monobasic unsaturated carboxylic acids such as 2,3-dichloroacrylic anhydride may be also used, although not necessarily with equivalent results. It is to be understood that the aforementioned specific examples of saturated compounds and polyhalo-, particularly polychloro-substituted unsaturated polybasic acid anhydrides are only representative of the class of compounds which may be employed, and that the present invention is not necessarily limited thereto.

The process of this invention may be effected in any suitable manner and may comprise either a batch or continuous type operation. For example, when a batch type operation is used, a quantity of the starting materials comprising the saturated compound containing a replaceable hydrogen atom on either a secondary or tertiary carbon atom and a polyhalo-substituted unsaturated polybasic acid anhydride which contains at least one chlorine atom on each of the doubly-bonded carbon atoms is placed in an appropriate apparatus along with the free radical-generating compound. The amount of each of the reactants which is utilized will be dependent upon either a dialkyl substituted or monoalkyl substituted unsaturated polybasic acid anhydride comprising the desired product. For example, when a dialkyl or dicycloalkyl substituted product constitutes the desirable product, it is desirable to utilize a very large excess of the saturated compound over the amount of polyhalo-substituted unsaturated polybasic acid anhydride which is present, said excess being in a mol ratio of from about 5:1 to about 10:1 or more mols of saturated compound per mol of anhydride. Conversely speaking, if a monoalkyl-substituted anhydride is to comprise the desired product correspondingly lower amounts of saturated compounds will be used. If the reaction is to be effected at superatmospheric pressure, the reaction vessel may comprise an autoclave of the rotating or mixing type. The autoclave is sealed and an inert gas such as nitrogen may be pressed in until the desired initial operating pressure is reached. The operating pressure may range from 1 to 100 atmospheres or more and is usually that amount of pressure which is required to maintain a major portion of the reactants in the liquid phase. The autoclave and contents thereof are then heated to the predetermined operating temperature which is in a range hereinbefore set forth and maintained thereat for the predetermined residence time. Upon completion of the residence period, heating is discontinued, the apparatus and contents thereof are allowed to return to room temperature, the excess pressure is discharged, and the vessel is opened. The liquid product is recovered and subjected to conventional means of separation and purification including extraction, washing, drying, evaporation, crystallization, distillation, usually under reduced pressure, etc., whereby the desired product comprising the alkyl substituted unsaturated polybasic acid anhydride is recovered.

It is also contemplated within the scope of this invention that the process may be effected in a continual manner of operation. When such a type of operation is employed, the starting materials comprising the saturated compound and the polyhalo-substituted unsaturated polybasic acid anhydride are continuously charged to the reaction zone which is maintained at the proper operating conditions of temperature and pressure. In addition, the free radical generating compound is also charged thereto through a separate line or, if so desired, it may be admixed with one or both of the starting materials prior to entry into said reactor and charged thereto along with said reactant. Upon completion of the desired residence time, the reactor effluent is continuously withdrawn and subjected to separation steps similar to those hereinbefore set forth, whereby the desired product is recovered and removed to storage while the unreacted starting materials are recycled to form a portion of the feed stock.

Examples of alkyl-substituted unsaturated polybasic acid anhydrides which may be prepared according to the process of this invention will include diisopropylmaleic anhydride, di-sec-butylmaleic anhydride, di-sec-pentylmaleic anhydride, di-sec-hexylmaleic anhydride, di-sec-heptylmaleic anhydride, dicyclopentylmaleic anhydride, dicyclohexylmaleic anhydride, dicycloheptylmaleic anhydride, 2,3-diisopropylglutaconic anhydride, 2,3-di-sec-butylglutaconic anhydride, 2,3-di-sec-pentylglutaconic anhydride, 2,3-di-sec-hexylglutaconic anhydride, 2,3-di-sec-heptylglutaconic anhydride, 2,3-dicyclopentylglutaconic anhydride, 2,3-dicyclohexylglutaconic anhydride, 2,3-dicycloheptylglutaconic anhydride, etc., 3-chloro-2-isopropylmaleic anhydride, 3-chloro-2-sec-butylmaleic anhydride, 3-chloro-2-sec-pentylmaleic anhydrides, 3-chloro-2-sec-hexylmaleic anhydrides, 3-chloro-2-sec-heptylmaleic anhydrides, 3-chloro-2-cyclopentylmaleic anhydride, 3-chloro-2-cycloheptylmaleic anhydride, etc., 3-chloro-2-propylglutaconic anhydride, 3-chloro-2-sec-butylglutaconic anhydride, 3-chloro-2-sec-pentylglutaconic anhydrides, 3-chloro-2-sec-hexylglutaconic anhydrides, 3-chloro-2-cyclopentylglutaconic anhydride, 3-chloro-2-cyclohexylglutaconic anhydride, 3-chloro-2-cycloheptylglutaconic anhydride, etc. It is to be understood that the aeforementioned compound are only representative of the class of compounds which may be prepared, and that the present invention is not necessarily limited thereto.

The following examples are given to illustrate the process of the present invention which, however are not intended to limit the generally broad scope of the present invention in strict accordance therewith.

EXAMPLE I

A mixture of 10 g. (0.06 mol) of dichloromaleic anhydride, 40 g. (0.48 mol) of cyclohexane, and 4 g. (0.03 mol) of di-t-butyl peroxide was placed in the glass liner of a rotating autoclave which was thereafter sealed and nitrogen pressed in until an initial operating pressure of 30 atmospheres was reached. The autoclave was then heated to a temperature of 130° C. and maintained at a temperature in the range of from 130° to 140° C. for a period of 4 hours during which time the maximum pressure rose to 51 atmospheres. At the end of this period, heating was discontinued and the autoclave allowed to return to room temperature, the final pressure at room temperature being 30 atmospheres. The excess pressure was discharged, the autoclave was opened, and the reaction product comprising a clear orange-amber liquid product was recovered. The liquid product was washed with 3 portions of water following which the somewhat turbid aqueous extract was shaken with 5 cc. of cyclohexane and the resulting yellow solution was added to the water-washed product. When the product was concentrated on a steam bath, white crystals separated out. The crystals were filtered off and the crystalline powder was washed with pentane. There was obtained a powder melting at about 115° C. The filtrate, a yellow oil, crystallized upon standing, recrystallization from cyclohexane yielding white granules which melted at 118° C.

The nuclear magnetic resonance spectrum showed the presence of a cyclohexyl moiety and the absence of vinyl protons. The infra-red spectrum indicated the presence of a carboxylic anhydride group. Microanalysis of the product indicated that it was dicyclohexylmaleic anhydride. A carbon-hydrogen analysis gave the following results:

Found (percent): C, 73.01, 73.41; H, 8.56, 8.25. Calculated for $C_{16}H_{22}O_3$ (percent): C, 73.25; H, 8.45.

EXAMPLE II

In this experiment, the reaction set forth in Example I was effected utilizing a smaller ratio of cyclohexane to dichloromaleic anhydride. A mixture comprising 40 g. (0.48 mol) of cyclohexane, 54 g. (0.32 mol) of dichloromaleic anhydride, and 8 g. (0.06 mol) of di-t-butyl peroxide was charged to a rotating autoclave which was thereafter sealed, nitrogen was pressed to an initial operating pressure of 30 atmospheres and the autoclave was heated to a temperature of 130° C. After maintaining the autoclave in a range of from 130° to 140° C. for a period of 4 hours, heating was discontinued and the autoclave allowed to return to room temperature. The excess pressure was discharged and the autoclave was opened and, the reaction product was recovered. It was taken up in ethyl ether, washed with water to remove hydrogen chloride, and then most of the ether was distilled off. The residue was submitted to preparative gas liquid chromatography to isolate a portion of the major product shown to be 3-chloro-2-cyclohexylmaleic anhydride by mass, nuclear magnetic and infra-red spectroscopy. A carbon-hydrogen analysis gave the following results:

Found (percent): C, 56.97; H, 5.40. Calculated for $C_{10}H_{11}O_3Cl$ (percent): C, 56.00; H, 5.17.

EXAMPLE III

In this example 15 g. (0.09 mol) of dichloromaleic anhydride, 59 g. (0.85 mol) of cyclopentane, and 3 g. (0.02 mol) of di-t-butyl peroxide were placed in the glass liner of a rotating autoclave which was sealed and pressured with 30 atmospheres of nitrogen and heated to a temperature of 130° C. After maintaining the autoclave in the range of from 130° to 140° C. for a period of 4 hours, heating is discontinued. The autoclave was allowed to return to room temperature, the final pressure dropping to 30 atmospheres at room temperature. The excess pressure was discharged, the autoclave was opened and the reaction product recovered therefrom. Separation and purification of this product in a manner similar to that set forth in the above examples resulted in the obtention of the desired products comprising (a) dicyclopentylmaleic anhydride and (b) 3-chloro-2-cyclopentylmaleic anhydride. Microanalysis of the products gave the following data:

(a) Found (percent): C, 71.43; H, 7.65. Calculated for $C_{14}H_{18}O_3$ (percent): C, 71.76; H, 7.74.

(b) Found (percent): C, 56.91; H, 5.48. Calculated for $C_9H_9O_3Cl$ (percent): C, 53.88; H, 4.52.

EXAMPLE IV

A mixture comprising 63 g. (0.63 mol) of n-heptane, 25 g. (0.15 mol) of dichloromaleic anhydride and 4 g. (0.03 mol) of di-t-butyl peroxide was placed in the glass liner of a rotating autoclave which was thereafter sealed and pressured with 30 atmospheres of nitrogen. The autoclave and contents thereof were heated to a temperature of 130° C. and maintained in a range of from 130° to 140° C. for a reaction period of 4 hours, during which time, the maximum pressure in the autoclave rose to 53 atmospheres. Upon completion of the 4 hour period, heating was discontinued and the autoclave was allowed to return to room temperature, the final pressure at room temperature being 30 atmospheres. This excess pressure was discharged, the autoclave was opened and the reaction mixture recovered therefrom. Treatment of the mixture with water to remove dissolved hydrochloric acid and unreacted dichloromaleic anhydride was followed by extraction with 10% aqueous solution of sodium hydroxide to isolate the desired product. The alkaline solution was acidified with hydrochloric acid, extracted with ether and distilled. The material boiled chiefly at 121° to 123° C. under 6.8 mm. mercury pressure. It was shown by infra-red and nuclear magnetic resonance to consist of the sec-heptyl derivative, namely, 3-chloro-2-(1-methylhexyl)maleic anhydride.

*Analysis.*—Found (percent): C, 57.73; H, 6.59. Calculated for $C_{11}H_{15}O_3Cl$ (percent): C, 57.26; H, 6.55.

EXAMPLE V

In this example, 18 g. (0.1 mol) of 2,3-dichloroglutaconic anhydride and 3 g. (0.02 mol) of di-t-butyl peroxide are placed in the glass liner of a rotating autoclave. The autoclave is sealed and 34 g. (0.8 mol) of propane is charged thereto followed by a sufficient amount of nitrogen so that an initial operating pressure of 30 atmospheres is reached. The autoclave is heated to a temperature of 130° and maintained at this temperature for a period of 4 hours. Upon completion of the residence time, heating is discontinued and the autoclave is allowed to return to room temperature. The excess pressure is discharged, the autoclave is opened and the reaction mixture is recovered therefrom. The mixture is treated in a manner similar to that set forth in Example I above whereby the desired product comprising 2,3-diisopropylglutaconic anhydride is separated and recovered.

I claim as my invention:

1. A process for the preparation of a $C_3$–$C_{20}$ alkyl-substituted alpah,beta olefinically unsaturated dicarboxylic anhydride which comprises condensing a $C_3$–$C_{20}$ saturated hydrocarbon having at least one hydrogen on a secondary or tertiary carbon atom with a polyhalo-substituted alpha,beta olefinically unsaturated dicarboxylic anhydride containing at least one chlorine atom on each of the doubly-bonded carbon atoms selected from the group consisting of dichloromaleic anhydride and 2,3-dichloroglutaconic anhydride in the presence of a free radical-generating compound at condensation conditions and recovering the resultant alkyl-substituted alpha, beta olefinically unsaturated dicarboxylic anhydride.

2. The process as set forth in claim 1 in which said condensation conditions include a temperature in the range of from about 50° to about 300° C. and at least as high as the decomposition temperature of said free radical-generating compound.

3. The process as set forth in claim 1 in which said free radical-generating compound is an organic peroxide.

4. The process as set forth in claim 1 in which said saturated hydrocarbon is a cycloalkane.

5. The process as set forth in claim 1 in which said saturated hydrocarbon is cyclohexane, said polyhalo-substituted alpha, beta olefinically unsaturated dicarboxylic anhydride is dichloromaleic anhydride and said alkyl-substituted alpha, beta olefinically unsaturated dicarboxylic anhydride is dicyclohexylmaleic anhydride or 3-chloro-2-cyclohexylmaleic anhydride.

6. The process as set forth in claim 1 in which said saturated hydrocarbon is cyclopentane, said polyhalo-substituted alpha,beta olefinically unsaturated dicarboxylic anhydride is dichloromaleic anhydride and said alkyl-substituted alpha, beta olefinically unsaturated dicarboxylic anhydride is dicyclopentylmaleic anhydride or 3-chloro-2-cyclopentylmaleic anhydride.

7. The process as set forth in claim 1 in which said saturated hydrocarbon is heptane said polyhalo-substituted alpha,beta olefinically unsaturated dicarboxylic anhydride is dichloromaleic anhydride and said alkyl-substituted alpha, beta olefinically unsaturated dicarboxylic anhydride is a di-sec-heptylmaleic anhydride or a 3-chloro-2-sec-heptylmaleic anhydride.

8. The process as set forth in claim 1 in which said saturated hydrocarbon is cyclohexane, said polyhalo-substituted alpha, beta olefinically unsaturated dicarboxylic anhydride is 2,3-dichloroglutaconic anhydride and said alkyl-substituted alpha, beta olefinically unsaturated dicarboxylic anhydride is 2,3-dicyclohexylglutaconic anhydride or 3-chloro-2-cyclohexylglutaconic anhydride.

9. The process as set forth in claim 1 in which said saturated hydrocarbon is propane, said polyhalo-substituted alpha, beta olefinically unsaturated dicarboxylic anhydride is 2,3-dichloroglutaconic anhydride and said alkyl-substituted alpha, beta olefinically unsaturated dicarboxylic anhydride is 2,3-diisopropylglutaconic anhydride.

References Cited

UNITED STATES PATENTS 3,474,110   10/1969   Merijan et al. _____ 260—346.8

ALEX MAZEL, Primary Examiner

B. DENTZ, Assistant Examiner

U.S. Cl. X.R.

260—346.8 (R)